United States Patent [19]

Calhoun et al.

[11] Patent Number: 5,589,246
[45] Date of Patent: Dec. 31, 1996

[54] HEAT-ACTIVATABLE ADHESIVE ARTICLE

[75] Inventors: Clyde D. Calhoun, Stillwater; David C. Koskenmaki, St. Paul, both of Minn.

[73] Assignee: Minnesota Mining and Manufacturing Company, St. Paul, Minn.

[21] Appl. No.: 324,333

[22] Filed: Oct. 17, 1994

[51] Int. Cl.⁶ .................................................. C09J 7/02
[52] U.S. Cl. .................... 428/120; 156/272.2; 428/119; 428/156; 428/167; 428/173; 428/182; 428/353; 428/354; 428/355 R; 428/355 AC
[58] Field of Search ................ 428/40, 120, 119, 428/156, 173, 343, 353, 167, 354, 182, 355; 604/389, 390, 272.2

[56] References Cited

U.S. PATENT DOCUMENTS

| | | | |
|---|---|---|---|
| Re. 24,906 | 12/1960 | Ulrich | 206/59 |
| 2,532,011 | 11/1950 | Dahlquist et al. | 154/53.5 |
| 3,144,399 | 8/1964 | Rainer et al. | 204/154 |
| 3,239,478 | 3/1966 | Harlan | 260/27 |
| 3,240,330 | 3/1966 | Christmas | 206/59 |
| 3,314,838 | 4/1967 | Erwin | 156/71 |
| 3,318,852 | 5/1967 | Dixon | 260/78.5 |
| 3,328,482 | 6/1967 | Northrup et al. | 260/825 |
| 3,551,391 | 12/1970 | Crocker et al. | 260/78.5 |
| 3,554,835 | 1/1971 | Morgan | 156/234 |
| 3,691,140 | 9/1972 | Silver | 260/78.5 |
| 3,897,295 | 7/1975 | Dowbenko et al. | 156/272 |
| 3,957,382 | 5/1976 | Greuel, Jr. et al. | 403/27 |
| 3,967,031 | 6/1976 | Lambert | 428/294 |
| 3,978,274 | 8/1976 | Blum | 428/476 |
| 3,997,702 | 12/1976 | Schurb et al. | 428/352 |
| 4,023,570 | 5/1977 | Chinai et al. | 128/290 |
| 4,054,697 | 10/1977 | Reed et al. | 428/40 |
| 4,151,319 | 4/1979 | Sackoff et al. | 428/40 |
| 4,166,152 | 8/1979 | Baker et al. | 428/522 |
| 4,181,752 | 1/1980 | Martens et al. | 427/54.1 |
| 4,223,067 | 9/1980 | Levens | 428/308 |
| 4,495,318 | 1/1985 | Howard | 524/375 |
| 4,547,431 | 10/1985 | Eckberg | 428/413 |
| 4,556,595 | 12/1985 | Ochi | 428/143 |
| 4,598,112 | 7/1986 | Howard | 524/78 |
| 4,612,230 | 9/1986 | Liland et al. | 428/167 |
| 4,629,663 | 12/1986 | Brown et al. | 428/343 |
| 4,731,273 | 3/1988 | Bonk et al. | 428/57 |
| 4,775,572 | 10/1988 | Bober et al. | 428/163 |
| 4,780,367 | 10/1988 | Lau et al. | 428/355 |
| 4,786,696 | 11/1988 | Bohnel | 526/88 |
| 4,797,315 | 1/1989 | Balmer et al. | 428/167 |
| 4,816,317 | 3/1989 | Balmer et al. | 428/167 |
| 4,816,318 | 3/1989 | Dorsey et al. | 428/167 |
| 4,822,687 | 4/1989 | Kessel et al. | 428/447 |
| 4,833,179 | 5/1989 | Young et al. | 522/183 |
| 4,849,267 | 7/1989 | Ward et al. | 428/41 |
| 4,859,512 | 8/1989 | Jones et al. | 428/40 |
| 4,881,999 | 11/1989 | Balmer et al. | 156/231 |

(List continued on next page.)

FOREIGN PATENT DOCUMENTS

WO93/17853  9/1993  WIPO.

OTHER PUBLICATIONS

*Handbook of Pressure Sensitive Adhesive Technology;* D. Satas, Ed.; Van Nostrand Reinhold: New York; pp. 585–597 (1989).

Primary Examiner—Nasser Ahmad
Attorney, Agent, or Firm—Gary L. Griswold; Walter N. Kirn; Lucy C. Weiss

[57] ABSTRACT

A heat-activatable adhesive article is provided. The article, preferably a tape, includes a substantially laterally stable heat recoverable carrier film having at least one surface comprising a recessed surface portion and a raised surface portion therein; and an adhesive layer in the recessed surface portion in an amount such that the adhesive does not extend above the raised surface portion thereby forming an exposed raised surface portion. In use, the carrier film recovers upon exposure to heat thereby allowing the adhesive in the recessed surface portion to contact a substrate. The heat-activatable adhesive article can be positionable, repositionable, or both.

25 Claims, 3 Drawing Sheets

U.S. PATENT DOCUMENTS

| | | | |
|---|---|---|---|
| 4,889,753 | 12/1989 | Brown et al. | 428/40 |
| 4,894,275 | 1/1990 | Pelzer | 428/166 |
| 4,925,715 | 5/1990 | Sato | 428/40 |
| 4,935,300 | 6/1990 | Parker et al. | 428/352 |
| 4,946,527 | 8/1990 | Battrell | 156/60 |
| 4,965,113 | 10/1990 | Jones et al. | 428/40 |
| 5,008,139 | 4/1991 | Ochi et al. | 428/40 |
| 5,073,423 | 12/1991 | Johnson et al. | 428/40 |
| 5,120,587 | 6/1992 | McDermott et al. | 428/40 |
| 5,127,974 | 7/1992 | Tomiyama et al. | 156/85 |
| 5,139,832 | 8/1992 | Hayashi et al. | 428/35.5 |
| 5,141,790 | 8/1992 | Calhoun et al. | 428/40 |
| 5,144,051 | 9/1992 | Kessel et al. | 556/64 |
| 5,204,160 | 4/1993 | Rouser | 428/167 |
| 5,212,011 | 5/1993 | Ishikawa et al. | 428/343 |
| 5,217,805 | 6/1993 | Kessel et al. | 428/352 |
| 5,227,233 | 7/1993 | Itaba et al. | 428/354 |
| 5,246,762 | 9/1993 | Nakamura | 428/172 |
| 5,254,302 | 10/1993 | Yamanaka | 264/129 |
| 5,273,805 | 12/1993 | Calhoun et al. | 428/156 |
| 5,275,871 | 1/1994 | Hambright | 428/207 |
| 5,296,277 | 3/1994 | Wilson et al. | 428/40 |
| 5,344,681 | 9/1994 | Calhoun et al. | 428/42 |
| 5,344,693 | 9/1994 | Sanders | 428/40 |
| 5,348,788 | 9/1994 | White | 428/131 |

HEAT-ACTIVATABLE ADHESIVE ARTICLE

FIELD OF THE INVENTION

The invention relates to a heat-activatable adhesive article, e.g., tape, and more particularly to an article having a flexible carrier film with a recessed surface portion and a raised surface portion therein.

BACKGROUND OF THE INVENTION

Pressure sensitive adhesive (PSA) sheets, films, and tapes are often difficult to apply to a substrate at a precise location without air entrapment or wrinkles, primarily due to preadhesion or "quick stick" behavior of the PSA. This is particularly true for "aggressive" PSAs that have high bond strengths and/or low temperature tack properties, and is especially problematic as the size of the article increases. Several methods and configurations have been developed to make application of PSA films and tapes easier.

For example, application aids, such as formulations containing a surfactant, water, and alcohol, or dry application aids containing particles, powders, or talcs, have been used to eliminate preadhesion. Such application aids, however, tend to affect the adhesive properties of the PSA and prevent rapid formation of a strong bond between adhesive and substrate.

Discontinuous coatings of nontacky materials projecting from the adhesive surface have also been used to prevent preadhesion of the PSA during application. Articles with these coatings can be placed against a substrate and freely moved over the substrate. Such coatings include patterned polymer coatings, particles, and films, for example. Yet another configuration used to make PSA films and tapes easier to apply uses a random distribution of hollow glass microspheres partially embedded in the adhesive as a means to prevent contact and preadhesion. Pressure application crushes the microspheres permitting the adhesive to contact the substrate and form a strong bond instantly.

Other methods of dealing with preadhesion include formation of pegs of adhesive, optionally containing beads, protruding from the PSA surface. Topologically structured adhesives have also been described. Various adhesive layer topologies include concave and convex V-grooves or hemispheres, and other three dimensional shapes. In general, these topologies provide adhesive sheets, films, and tapes with lower peel adhesion values in comparison with smooth surfaced adhesives. In many cases, the topologically structured adhesives also display a change in adhesion with increasing contact time.

These adhesive articles exhibit various types of positionable and repositionable behavior. Certain of these articles can suffer from problems, however. Therefore, alternative methods for avoiding preadhesion when using pressure sensitive adhesives are needed. Furthermore, methods of adhering such articles upon the application of heat and without the application of pressure are also desirable.

SUMMARY OF THE INVENTION

The present invention provides a heat-activatable adhesive article having a carrier film, preferably a flexible carrier film, with at least one surface with a recessed surface portion (having one or more recesses) and a raised surface portion (having one or more projections) therein. An adhesive, preferably a pressure sensitive adhesive, is coated on this surface such that the raised surface portion, i.e., projection or plurality of projections, extends above the surface of the adhesive. As a result of this construction, certain preferred embodiments can be freely moved around on the substrate without significant preadhesion. Other embodiments can be positioned, easily removed, and repositioned. Thus, the present invention provides positionable and/or repositionable articles. Upon the application of thermal energy, i.e., heat, the carrier film is "activated" or modified in a manner that allows the adhesive to contact the substrate to which the article is to be adhered. For example, the projections can be retracted thereby allowing the adhesive to contact the substrate.

The raised surface portion in the carrier film can be substantially continuous, thereby forming one continuous projection. This results in the recessed surface portion being discontinuous. When the recessed surface portion is discontinuous, separate recesses are formed that are spaced apart from one another. In this embodiment, the recesses act as individual pockets or containers for the adhesive and allow the adhesive to be patterned into individual segments. Each of the individual recesses of this segmented recessed surface portion are not completely filled with adhesive, thereby allowing the raised surface portion to extend above the level of the adhesive.

Alternatively, the raised surface portion can be discontinuous. If the raised surface portion is discontinuous, the surface of the carrier film contains a plurality of spaced apart projections, i.e., protrusions, preferably substantially uniformly distributed, protruding through the adhesive layer at intermittent points along the surface of the adhesive. In this embodiment, the recessed surface portion is substantially continuous. Thus, this embodiment comprises a surface with one recess that is substantially continuous and interrupted by projections penetrating therefrom.

Whether the raised surface portion or recessed surface portion is continuous or discontinuous, the amount or thickness of the adhesive coated on the surface of the carrier film does not extend above the height of the raised surface portion, i.e., projection or projections, that extend from the backing portion of the carrier film. Thus, in certain preferred embodiments the tip or top exposed surface of the raised surface portion, i.e., the portion of the projection(s) that are above the surface of the adhesive, is substantially nontacky, which makes the adhesive article positionable. In this context, positionable means that the portion of the carrier film that contacts the substrate prior to application of heat to the carrier film is substantially nontacky such that the adhesive article can be easily slid over the surface into proper position without preadhering to the substrate.

This substantially nontacky character does not necessarily mean that the tips of the projections are free of all adhesive, although this is a particularly preferred embodiment. Rather, the tips of the projections can be coated with a very thin layer of adhesive, e.g., the same adhesive contained on the recessed surface portion or a different adhesive, or it can be coated with a thicker layer of adhesive that has been detackified, by crosslinking for example.

Alternatively, the tops of the exposed surface portions of the projections can be covered by a layer of a tacky adhesive, thereby allowing the article to be repositionable, although not positionable. This layer of adhesive could be the same adhesive that is in the recessed surface portion. Whether positionable, repositionable, or both, the articles of the present invention all have a portion of the carrier film that extends above the surface of the adhesive on the recessed surface portion such that the adhesive does not contact the substrate until the article has been subjected to thermal energy and the carrier film "activated," i.e., modified, to allow such contact.

The carrier film is substantially laterally stable, yet heat recoverable. That is, the carrier film, and therefore the article which it forms, recovers toward an original shape from which it had previously been deformed upon the application of thermal energy. Typically, the overall length and width of the article does not significantly change, while the surface recovers toward a substantially smooth configuration. Thus, although the carrier film is substantially laterally stable, i.e., the size and shape of the adhesive article generally remains the same in its length and width, changes in the thickness of portions of the carrier film (i.e., protrusions or recesses) can occur to allow the adhesive to contact the substrate. That is, the raised surface portion (or alternatively the recessed surface portion) can collapse or retract to allow the adhesive to contact the substrate by heating the carrier film. The term "recoverable" as used herein, also includes an article that adopts a new configuration even if it has not been previously deformed.

One method of making the carrier film recoverable upon exposure to thermal energy is to build a memory into the film during embossing, so that when heated, the film approaches its original condition prior to embossing, i.e., a flat or smooth film. This memory can be built into the raised or recessed surface portions, but it is not built into the entire film. In effect, the carrier film acts as a heat shrink film in these raised or recessed surface portions, but it generally maintains its lateral dimensions.

Another method of making the carrier film recoverable upon exposure to thermal energy is to incorporate projections into the carrier film by adhering "stand-offs" to a backing portion of the film. These stand-offs are typically made of a material that is different from the material of the backing portion of the carrier film, which is itself heat-activatable. Upon application of thermal energy, the stand-offs are modified such that they allow the adhesive on the recessed surface portion to contact the substrate. Examples of materials suitable for making the stand-offs include low melting thermoplastic polymers, foams, or hot melt adhesives. As used herein, a carrier film with such heat-activatable stand-offs is "recoverable" even though the carrier film has not been deformed as by embossing.

The adhesive used in the articles of the invention can be any of a wide range of adhesives, e.g., pressure sensitive, hot melt, etc. Preferably, the adhesive is a pressure sensitive adhesive. Suitable pressure sensitive adhesives can be selected from a wide variety of adhesives including silicones, polyolefins, polyurethanes, polyesters, acrylates, polyamides, and natural or synthetic rubber-resin pressure sensitive adhesives.

The heat-activatable adhesive articles of the present invention are particularly advantageous at least because they are relatively inexpensive to prepare. For example, the raised surface portion of the carrier film can be created by an embossing step in a film extrusion process. Furthermore, the adhesive articles of the present invention can be applied without the application of pressure. That is, the article can be applied to a surface and the carrier film activated with only heat, as by the application of infrared radiation or heated gas, for example, to allow the adhesive to contact and adhere to the substrate.

The present invention also provides methods of adhering a heat-activatable adhesive article to a substrate. One particular embodiment involves applying the heat-activatable adhesive article to the substrate and applying a sufficient amount of heat to the article such that the carrier film is modified to allow the adhesive on the recessed surface portion to contact the substrate. In this method, the heat-activatable adhesive article can be any of those described above.

An alternative method involves: applying a heat-activatable adhesive article to the substrate, wherein the heat-activatable adhesive article comprises a carrier film, an adhesive layer coated thereon, and a layer of substantially nonadhesive particles coated on the adhesive layer; and applying a sufficient amount of heat to the article to modify the substantially nonadhesive particles such that they allow the adhesive layer to contact the substrate. In this embodiment, the substantially nonadhesive particles are modified (e.g., sublime, melt, collapse, shrink), thereby allowing the adhesive to contact the substrate. These particles are distinct from the stand-offs described above in that the substantially nonadhesive particles are not a part of, or directly adhered to, the backing material of the carrier film. Rather, the substantially nonadhesive particles are distributed over the surface of the adhesive layer or partially embedded in the adhesive layer.

In this application:

"adhesive" refers to the adhesive composition, and may also refer to the adhesive layer of an adhesive article;

"carrier film" means a thin, preferably flexible, sheet and is also referred to as a carrier web; in certain embodiments, the carrier film consists of a backing portion and "stand-offs" adhered thereto;

"positionable" refers to an adhesive article that can be placed against a substrate and easily slid over the surface into proper position without preadhering to the substrate;

"repositionable" refers to an adhesive article that can be repeatedly applied to and removed from a substrate surface without substantial loss of adhesive properties and without damage to the substrate surface;

"sheet" means a thin, large surface area article that can be rectangular in shape or in other configurations such as alphanumeric characters;

"substantially uniformly distributed" means the unit average density of protrusions (e.g., stand-offs), recesses, or substantially nonadhesive particles is uniform over the whole adhesive article in a regular or random pattern as is necessary to make the article positionable or repositionable;

"substrate" means the surface to which an adhesive article is applied; and

"tack" means instant contact adhesion between the adhesive and the substrate, and the tack may be substrate specific.

DETAILED DESCRIPTION

The adhesive articles of the present invention are heat-activatable. That is, the carrier film on which the adhesive is coated can be activated, i.e., modified, upon exposing it to thermal energy, i.e., heat, such that the adhesive can contact the substrate to which the article is to be adhered. This is accomplished by using a carrier film with a raised surface portion, either as one continuous projection or a plurality of projections, that extends above the level of the adhesive so as to not allow the adhesive to contact the substrate. Upon the application of heat, the carrier film is modified (by retracting or shrinking the projections, for example) and the adhesive is allowed to contact the substrate.

The portion of the carrier film between the projections, i.e., the portion "containing" the adhesive, is referred to as a recessed surface portion, i.e., a continuous recess or a plurality of recesses. This is not intended to indicate that this portion of the carrier film is a "container" with side walls, although it could be described as such. Rather, this term is generally used in a comparative sense. Thus, if an initially flat carrier film is embossed such that portions of the film protrude above the initial plane of one surface (the frontside of the carrier film, for example), these protrusions comprise the raised surface portion and the remainder of the surface comprises the recessed surface portion. See, for example, the frontside 20 of the carrier film in FIG. 1, which is discussed in further detail below. Alternatively, if an initially flat carrier film is embossed such that portions of the film are recessed below the initial plane of one surface, these recesses comprise the recessed surface portion and the remainder of the surface comprises the raised surface portion. See, for example, the backside 22 of the carrier film in FIG. 1.

Thus, the present invention provides a heat-activatable adhesive article, preferably in the form of a tape, with a carrier film having two oppositely parallel surfaces wherein at least one of the surfaces includes at least one recess having a major surface which is substantially continuous and interrupted by projections protruding therefrom; and preferably a pressure sensitive adhesive on (or in) the recess. In use, the carrier film recovers upon exposure to heat thereby allowing the adhesive on the recessed surface portion to contact the substrate. As stated above, the carrier film is substantially laterally stable, i.e., the size and shape of the adhesive article generally remains the same in its length and width. Dimensional changes occur only in the raised surface portion (or alternatively the recessed surface portion) by collapsing or retracting, for example, to allow the adhesive to contact the substrate when the carrier film is heated.

The heat-activatable articles of the present invention can be positionable, repositionable, or both. Preferably, they are at least positionable, i.e., the adhesive article can be placed against a substrate and easily slid over the surface into the desired position without preadhering to the substrate. If an article is initially repositionable it typically will not be positionable, although if an article is initially positionable it can be repositionable after the application of heat. It is understood by one of skill in the art that an article of the present invention can be initially positionable and subsequently repositionable by the proper choice of adhesive. It is also understood by one of skill in the art that once a positionable article of the present invention becomes repositionable, it is no longer positionable. That is, with the use of appropriate repositionable adhesives, the heat-activatable adhesive article can be removed after the application of heat, and optionally pressure, and repositioned. Once the article with a repositionable adhesive has been adhered to a surface and is removed, however, it can no longer be slid over the substrate without preadhering to it.

The heat-activatable adhesive articles of the present invention can be in the form of sheets, films, and tapes, for example. They can be used in a variety of applications such as in decorative and informative markings on vehicles; signage; buildings; fascia; awnings; tapes, such as transfer tapes, double-sided tapes, photographic and other layout tapes; as well as masking tapes for paint spraying; wallpaper; and the like. If the heat-activatable articles of the present invention are transfer tapes, the adhesive releases from the carrier film, typically as a result of a release layer between the carrier film and the adhesive. Furthermore, the carrier film can include additional functional and decorative layers, such as clear coats, decorative adhesive layers, screen printable inks, barrier layers, adhesion promoters, multilayers of translucent films, and the like. Such functional and decorative layers are known in the art and can be used, applied, or laminated according to techniques known to those skilled in the art.

Figure 1:
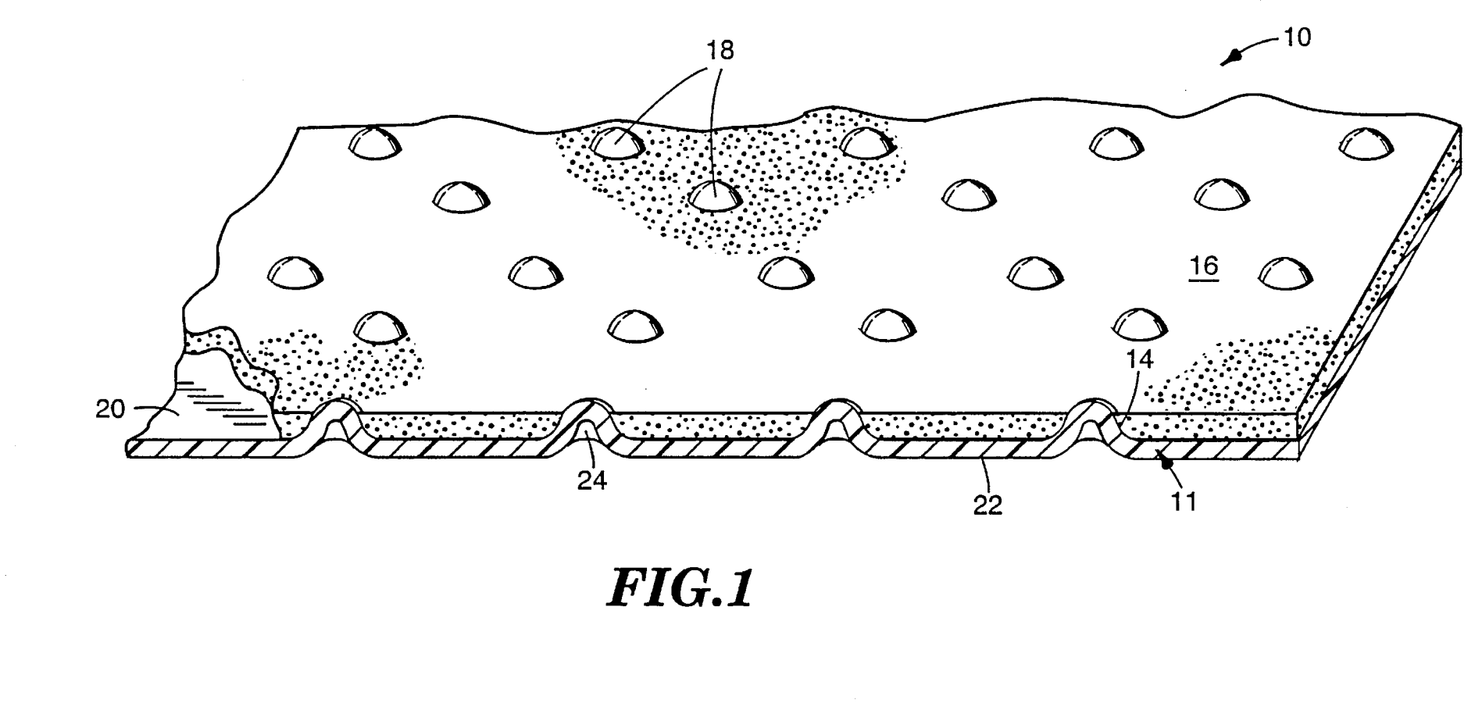
FIG. 1 is a perspective view of one embodiment of a heat-activatable adhesive article of the present invention having a surface with a discontinuous raised surface portion, i.e., projections, between which is a continuous recessed surface portion on which an adhesive is coated.

A preferred embodiment of a heat-activatable adhesive article of the invention is shown in FIG. 1. In this embodiment, the raised surface portion is discontinuous and the recessed surface portion is substantially continuous. Pressure sensitive adhesive tape 10 has a flexible carrier film 11 that is embossed to form a recessed surface portion 14 having thereon a layer of an adhesive 16. A plurality of spaced-apart projections (i.e., protrusions) 18 of carrier film 11 protrude through the substantially continuous adhesive layer 16 at intermittent points along the surface of the adhesive layer 16. Thus, the raised surface portion is discontinuous, forming projections 18 that are preferably substantially uniformly distributed with a height that is greater than the thickness of the adhesive layer. These projections 18 can have any desired shape, dimension, and pattern. For example, they can be flattened on the top, convex, have a small concave indentation in the top to accommodate a small amount of an adhesive, or have a small hole in the top to allow air bleed. For certain preferred embodiments, however, they have convex tops as shown in FIG. 1.

The raised and recessed surface portions can be on only one side, i.e., one surface, of the carrier film, or they can be on both sides of the carrier film. If they are on both sides, the protrusions on one side of the carrier film can create recesses on the opposite side, although this does not always occur. FIG. 1 shows a frontside 20 of the carrier film with protrusions 18 and a backside 22 with corresponding recesses 24.

Similarly, the continuous recess 14 on the frontside 20 has a corresponding continuous protrusion on the backside 22. Alternatively, the backside 22 could be a flat surface with no protrusions or recesses.

Figure 2:
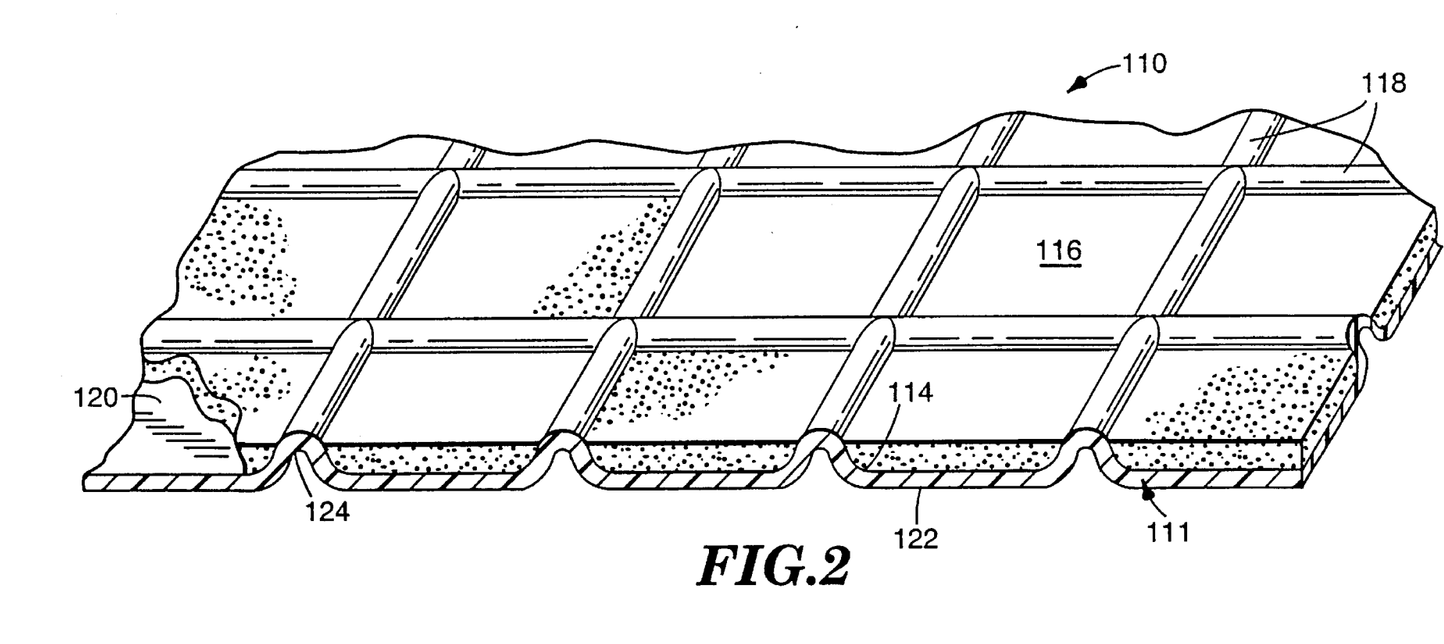
FIG. 2 is a perspective view of an alternative embodiment of a heat-activatable adhesive article of the present invention having a surface with a discontinuous recessed surface portion, i.e., plurality of segmented recesses, between which is a continuous raised surface portion. The adhesive is coated in the segmented recesses.

An alternative preferred embodiment of a heat-activatable adhesive article of the invention is shown in FIG. 2. In this embodiment, the raised surface portion in the carrier film is substantially continuous, thereby forming one continuous projection, and the recessed surface portion is discontinuous, thereby forming separate segments or recesses spaced apart from one another. The recesses act as individual pockets or containers for the adhesive and allow the adhesive to be patterned into individual segments. The individual recesses are not completely filled with adhesive, thereby allowing the raised surface portion to extend above the level of the adhesive.

Although the backside of the carrier film of this article can be flat (i.e., without any projections or recesses therein), the embodiment shown, i.e., tape 110, is composed of flexible carrier film which has been embossed to have a plurality of recesses on one side and a plurality of corresponding projections on the opposite side. Specifically, the pressure sensitive adhesive tape 110 has a flexible carrier film 111 that is embossed to form a plurality of recesses 114, containing a layer of adhesive, preferably a pressure sensitive adhesive, 116, and one continuous raised surface portion 118 on the frontside 120 of the carrier film 111. The exposed surface of the raised surface portion 118 is preferably substantially free of any adhesive. On the backside 122 of the carrier film, there is a substantially continuous recess 124 corresponding to the continuous projection 118 and a plurality of projections corresponding to the recesses 114. Depending on the shape and form of the continuous raised surface portion 118, the articles of this invention can have an almost infinite number of patterns.

Figure 3:
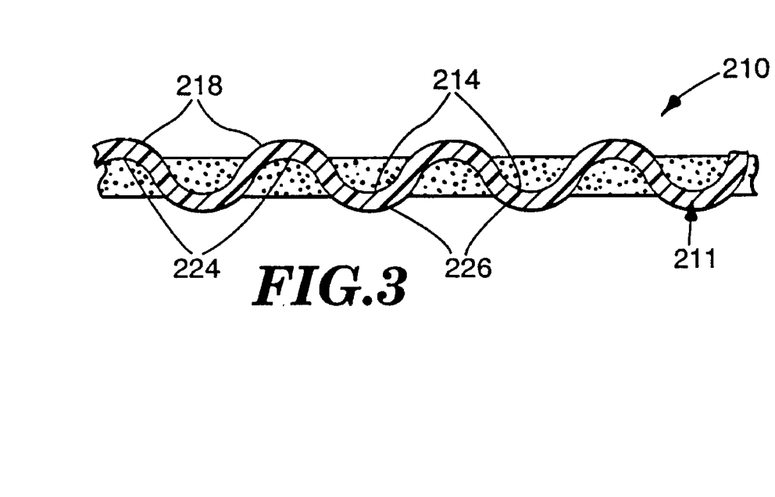
FIG. 3 is a cross-sectional view of an alternative embodiment of a heat-activatable adhesive article of the present invention having two oppositely parallel surfaces (or sides), each of which has a raised surface portion and a recessed surface portion with an adhesive coated on the recessed surface portion on each side.
Figure 4:
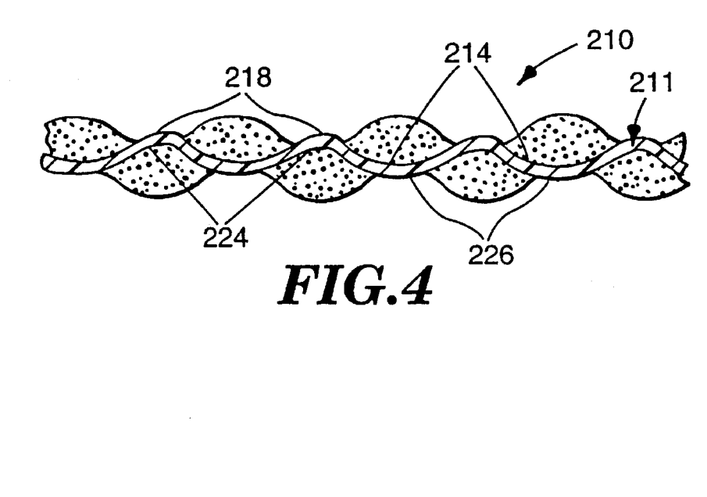
FIG. 4 is a cross-sectional view of the heat-activatable adhesive article shown in FIG. 3 after heat has been applied to the article and the raised surface portion (or alternatively the recessed surface portion) collapsed or retracted to allow the adhesive to contact the substrate.

FIGS. 3 and 4 show another preferred embodiment of a heat-activatable adhesive article of the invention before heat activation (FIG. 3) and after heat activation (FIG. 4). As in the embodiment shown in FIG. 2, tape 210 is composed of a flexible carrier film 211 which has been embossed to have a plurality of recesses 214 and projections 218 on one side and a plurality of corresponding projections 226 and corresponding recesses 224 on the opposite side. In this embodiment, however, the adhesive is coated on both surfaces of the carrier film in (or on) recesses 214 and 224 in an amount such that projections 218 and 226 extend above the level of the adhesive. Thus, the present invention includes within its scope two-sided heat-activatable tapes. Once the tape is positioned and heat is applied, the carrier film recovers and the adhesive extends above the level of the projections. The tape is then in a configuration to be adhered to a substrate, preferably to bond two surfaces together.

Figure 5:
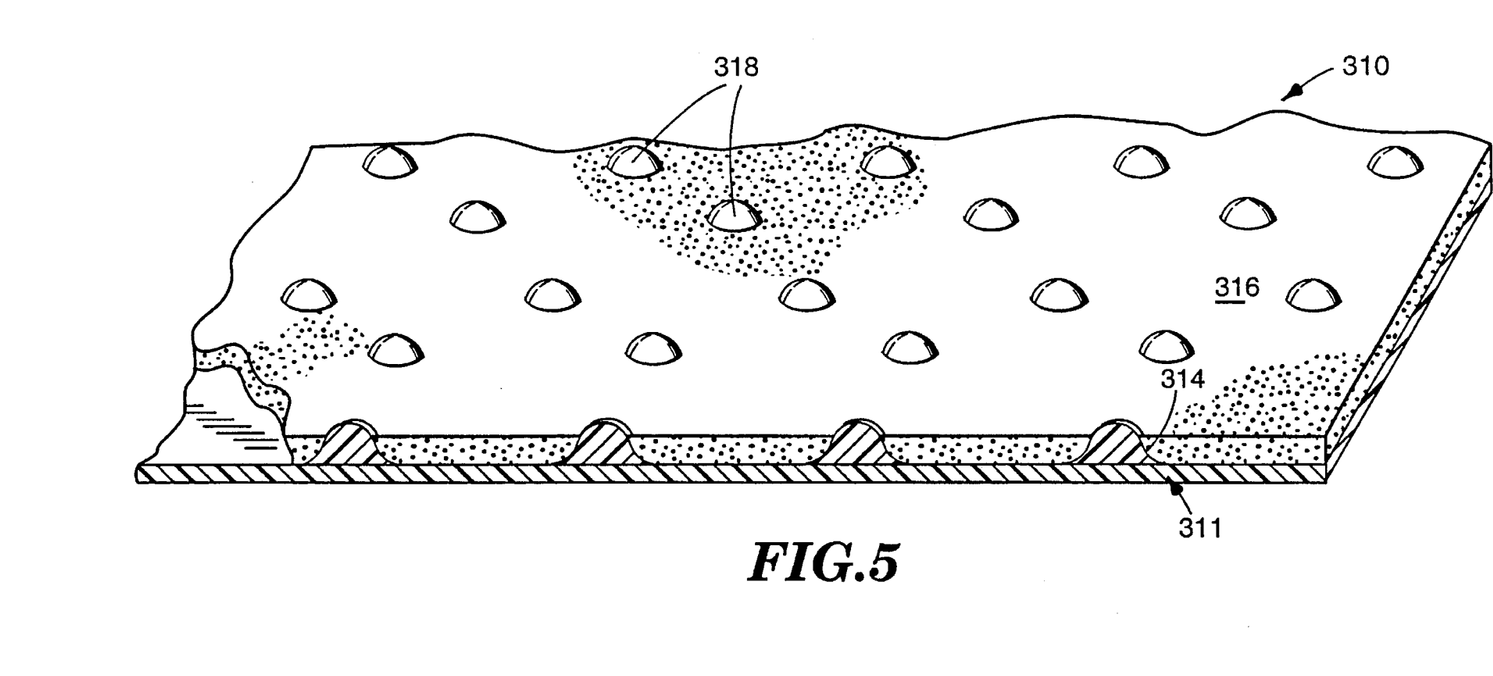
FIG. 5 is a perspective view of an embodiment of a heat-activatable adhesive article of the present invention having a surface with stand-off projections that protrude above the surface of the adhesive.

FIG. 5 is yet another example of a heat-activatable adhesive article of the present invention. In this embodiment, as in FIG. 1, there is shown a pressure sensitive adhesive tape 310 having a flexible carrier film 311 with a recessed surface portion 314 having thereon a layer of an adhesive 316. A plurality of spaced-apart projections 318 protrude through the substantially continuous adhesive layer 316 at intermittent points. Unlike the embodiment shown in FIG. 1, these projections are actually "stand-offs" adhered to film 311. Such stand-offs are made of a heat-activatable material that is different from the material of the rest of the carrier film. As used in this embodiment, the carrier film includes the stand-offs which are attached to the backing portion of the carrier film. Upon application of thermal energy, these stand-offs are modified thereby allowing the adhesive in the recessed surface portion to contact the substrate; however, the overall lateral dimensions of the carrier film do not substantially change. The stand-offs are generally modified by a reduction in their height or the distance they extend above the surface of the adhesive, which can occur if the stand-offs melt, for example.

Examples of suitable materials for the stand-offs include, but are not limited to: low melting thermoplastic polymers, such as polystyrene, polyolefins, polyesters, polyacrylates, polymethacrylates, and copolymers of acrylates and methacrylates; hot melt adhesives having a melting point above about 120° F. (49° C.), preferably above about 240° F. (116° C.), but not greater than the melting point of the carrier film, such as polyesters, polyacrylates, polyamides, and copolymers thereof; and foams of any of these materials. It should be understood that, as used herein, a carrier film with such heat-activatable stand-offs is "recoverable" even though the carrier film has not been deformed as by embossing.

Thus, the carrier film of the present invention is heat recoverable, and the heat recoverability can be incorporated into the carrier film by embossing the material or by adding a different material in the form of stand-offs to the surface of the carrier film. Preferably, the carrier film is an embossed heat recoverable material. In such embodiments, the carrier film is a polymeric material composed of any suitable polymer that can be "memory shaped," i.e., shaped to build a memory into the film during embossing so that when heated the film wants to return to (or at least approach) its condition prior to embossing, i.e., a flat or smooth film. This memory can be built into the raised or recessed surface portions, but it is not built into the entire film. Suitable polymeric materials that can be memory shaped include, but are not limited to: polyolefins, such as high density polyethylene, low density polyethylene, and polyethylene copolymers, such as ethylene/ethyl acrylate copolymer, ethylene/acrylic acid copolymer, and ethylene/vinyl acid copolymer; fluoropolymers, such as polyvinylidene fluoride and ethylene/tetrafluoroethylene copolymer; nylon; polyvinylchloride; and elastomers. The polymeric material is normally extruded or otherwise melt-shaped. The thickness of the material is dependent on the size of the substrate and the strength required by the article in its recovered state.

In such embodiments, at least part of the carrier film has an embossed pattern, which is lessened and often "disappears" when adequate heat is applied. The embossed pattern may be applied by a number of methods, for example by stamping or using a hot press. Such materials exhibit the property of elastic or plastic memory. One method of producing a heat-recoverable article includes shaping the polymeric material into the desired heat stable form, subsequently crosslinking the polymeric material, heating the article to a temperature sufficient to permit deformation of the article yet retain restorative forces imparted by crosslinking or crystallinity, and cooling the article while in the deformed state so that the deformed state of the article is retained. In use, because the deformed state of the article is heat-unstable, heat can be applied that is sufficient to cause the article to approach its original, heat stable shape, i.e., to invoke the memory effect. Such energy sources include, but are not limited to infrared radiation sources, hair dryers, heated rolls, etc. Thus, the embossed pattern will generally "disappear" and the carrier film will become substantially smooth. As used herein, "substantially smooth" means the top of the projections in the embossed pattern, following heating and recovery of the article, are below the surface of the adhesive layer.

The embossed pattern can be composed of a regular arrangement or array, an abstract design, or a random pattern. Depending on the application, the embossed pattern may cover only part of the first surface of the polymeric element or it may cover substantially the entire first surface. Isolated and random cosmetic flaws, occurring as a result of the preparation of the article, are not considered an embossed pattern for purposes of this specification.

The size and shape of the recesses and projections in the embossed carrier web are not normally critical, but should be selected to match the intended application. The depth of the recesses is also not critically limited, but is normally less than 0.25 mm as are the thicknesses of typical adhesives. The height of the projections must be larger than the thickness of the adhesive coated on the recessed surface portion. The three dimensional shape of the recesses and projections can easily be controlled if desired and tailored to specific applications. Cross-sections of the three dimensional shapes, which is taken parallel to the surfaces of the carrier film, can be of a wide variety of shapes, including oval, circular, polygonal, or rectangular.

In embodiments in which stand-offs are used to form protrusions on the carrier film, the stand-offs are made of a heat-activatable material that is different from that of the rest of the carrier film material, i.e., the backing portion of the carrier film, as discussed above. In such embodiments, the backing portion of the carrier film is not limited to a polymeric material. Rather, it can be any thick or thin plastic (synthetic or natural), reflective sheeting, fabric (woven or nonwoven), paper, metal foil, composite material, etc. The backing portion of the carrier film can be constructed such that the resulting article is a graphic article, a transfer tape, a double-sided tape, an awning, and the like.

The type of adhesive used in the articles of this invention is not critically limiting. Particularly for discontinuous recessed surface portions, the adhesives used in the invention can extend over a wide range of types and viscosities because the carrier film prevents lateral flow of the adhesive. The adhesive can be substantially nontacky at room temperature if it becomes tacky at an elevated temperature at which it is to be used. Alternatively, the adhesive can be nontacky to the touch but aggressively tacky to other substrates. These adhesives are substrate specific and provide an appropriate adhesive bond between the substrate and the adhesive sheet.

Pressure sensitive adhesives are preferred for use in the embodiments of the present invention. Non-pressure sensitive adhesives such as thermally activated or solvent-activated adhesives can be used, but they are less preferred embodiments than pressure-sensitive adhesives because of their more difficult application and greater tendency to entrap air during application. The benefit of a pressure sensitive adhesive is its natural flexibility and elongation properties. For conventional pressure sensitive adhesive articles, pressure is generally used to adhere the adhesive article to the substrate, although it is not always required. However, once heat is applied to the articles of the present invention to cause the carrier film to recover and allow the adhesive to contact the substrate, pressure may or may not need to be applied to the article to achieve the desired level of adhesion. While the adhesive sheet can employ a wide variety of art known pressure sensitive adhesives, the pressure sensitive adhesive is preferably one that is aggressively tacky and forms strong bonds on contact with substrates.

Pressure sensitive adhesives are art recognized as a standard class of materials. These are adhesives, which in solvent-free form are aggressively and permanently tacky at room temperature (e.g., 20°–30° C.) and firmly adhere to a variety of dissimilar surfaces upon contact. The adhesives require no activation by water, solvent, or heat in order to exert a strong adhesive holding force towards such materials as paper, cellophane, glass, plastic, wood, and metals. The adhesives have a sufficiently cohesive strength and elastic properties such that, despite their aggressive tackiness, they can be handled with the fingers and removed from smooth surfaces without leaving a substantial residue. A variety of materials and compositions useful as pressure-sensitive adhesives are available commercially and are thoroughly discussed in the literature. See, for example, U.S. Pat. Nos. Re. 24,906; 3,551,391; 3,239,478; 3,897,295; 4,181,752; 4,223,067; 4,629,663; 4,780,367; and 4,833,179.

Pressure sensitive adhesives suitable for use in this invention are coatable adhesives. A wide variety of coatable pressure sensitive adhesives can be used, such as solvent coatable, melt-coatable, as well as latex PSA's coated out of water. Also, solventless curable adhesives (often referred to as 100% solids) can be used. Where thicker adhesive coatings are desired, it may be desirable either to apply multiple layers of the adhesive or to photopolymerize an adhesive in situ. Specific examples of preferred types of adhesives include acrylates, e.g., isooctyl acrylate/acrylic acid copolymers and tackified acrylate copolymers; natural or synthetic rubber resins such as nitrile rubbers, e.g., acrylonitrile-butadiene; silicone-based adhesives, e.g., polysiloxanes; polyolefins; polyesters; polyamides; and polyurethanes.

Repositionable adhesives can be used to impart repositionability to the articles of the present invention. Such adhesives can be repeatedly applied to a substrate and removed from that substrate without experiencing a significant loss or deterioration of the adhesive properties of the adhesive. Additionally, the adhesive should not cause damage to the substrate surface when it is removed. As one skilled in the art will recognize, the substrate influences what type of adhesive can be removed from the substrate without damaging the substrate surface. For example, a more delicate surface, such as paper, would tolerate only less aggressive adhesives whereas a metal surface would tolerate quite aggressive adhesives. Microsphere adhesives, such as those described in U.S. Pat. Nos. 3,691,140; 4,166,152; 4,495,318; 4,598,112; and 4,786,696, for example, have found utility as repositionable adhesives for paper surfaces.

In some positionable embodiments there can exist a very thin layer of adhesive on the exposed surface of the projections, i.e., the tips of the projections. Because these films are generally very thin, they do not have a deleterious effect on the positionability of the preferred articles of the present invention. Alternatively, in other positionable embodiments there can exist a layer of adhesive on the exposed surface of the projections if the tackiness of the adhesive is reduced, by crosslinking for example. In repositionable embodiments it is desirable to have a layer of adhesive on the exposed surface of the projections. This adhesive can be the same as the adhesive in the recessed surface portion of the carrier film, or it can be a different adhesive. If the adhesive is not normally a repositionable adhesive, a thin layer of the adhesive can be used on the exposed surface of the projections thereby making the article repositionable. It can also be a different adhesive that has substantially less tack, i.e., a repositionable adhesive.

If desired, particulates can be added to the adhesive prior to coating into the recesses. For example, conductive particles such as silver, nickel, or gold coated glass beads may be added to provide electrical and thermal conduction.

The viscosity of the adhesive solution, emulsion, suspension, or prepolymer syrup should be low enough to permit the adhesive to fill the recess(es) in the embossed carrier film and allow the projections to protrude above the surface of the adhesive layer. Conventional coating techniques utilized in the manufacture of adhesive tape constructions can be used to apply the adhesive compositions to the carrier films of the present invention. These techniques include, but are not limited to, knife coating, roll coating, reverse roll coating and gravure coating techniques. The resulting coating is then passed through a heat cycle to remove the solvent or water to produce the adhesive construction. Alternatively, a solventless, curable adhesive (often referred to as 100% solids adhesive) can be applied to the carrier film using knife coating or metered coating techniques similar to those described above and subsequently cured to an adhesive state by exposure to ultraviolet radiation or heat. As one skilled in the art will recognize, the coating technique should be selected such that it does not cause premature activation of the carrier film and the consequent retraction of projections.

In another variation of the invention, particularly for transfer tapes (which are discussed in further detail below) having a plurality of recesses (i.e., a heat-activatable segmented transfer tape), two different adhesives may be coated into different recesses. For example, alternating rows of the recesses can be coated with separate adhesives, such that when a substrate contacts the adhesive segments, segments of more than one type of adhesive are transferred to the substrate. The advantage to this embodiment is that two adhesives can be combined to obtain a utility not possible from either of the adhesives used separately. In yet another variation, two or more adhesives having different properties can be sequentially coated into the same recesses.

Typically, if the tapes shown in FIGS. 1, 2, and 5 are stacked in sheets or wound into rolls (and then unwound), the projections keep the adhesive from contacting the uncoated side of the backing. Preferably, there is no contact between the adhesive in the recessed surface portion on the frontside of the carrier film and the backside of the carrier film when stacked or rolled. A release coating, i.e., release layer, as discussed below, can optionally be applied to the backside of the carrier film to ensure that the adhesive remains in the recesses.

Referring to FIG. 1 again, if the construction is a transfer tape, the frontside 20 of film 11 is preferably precoated with a release coating (not shown) over which the pressure sensitive adhesive 16 is coated. Subsequent to heat activation, adhesive 16 will be transferred as a substantially continuous film with intermittent void regions caused by the projections 18. For example, an adhesive 16 transferred from an embossed carrier film 11 having a regular array of isolated projections 18 would appear as a perforated adhesive film. When the adhesive 16 is transferred to an article, the perforations in the film can permit air and liquid to pass through the film, thus making the adhesive suitable for applications requiring passage of liquids or vapors.

In transfer adhesive constructions where an optional release coating is used on the backside of the carrier film, that release coating should be chosen such that it provides a lower level of release than the release coating underneath the adhesive. This lower level of release allows the adhesive to release from the backside of the carrier film upon unwinding and therefore remain in the recesses. This is not a necessary requirement of the invention, however.

Useful materials for release coatings include, but are not limited to: silicones; epoxy silicones; fluorine-containing compounds, such as polyfluoropolyethers and fluorosilicones; polyvinyl carbamates; acetates; and acrylates. Various materials and compositions useful as release coatings are available commercially and are discussed in the literature. See, for example U.S. Pat. Nos. 2,532,011; 3,240,330; 3,318,852; 3,967,031; 3,978,274; 4,822,687; 4,889,753; 5,144,051; 5,217,805; and 5,273,805. See, also, U.S. Pat. No. 5,344,681 for a discussion of segmented transfer tapes, release coatings, etc.

The release characteristics of the release coatings can be adjusted by known methods. For example, an applicable method for increasing peel adhesion values in silicone release coatings is to blend a silicone composed of polydimethylsiloxane with a less effective release material as disclosed in U.S. Pat. Nos. 3,328,482 and 4,547,431. Another method for modifying such silicone release coatings is to chemically modify the silicone itself to increase the non-silicone content of the coating as described in U.S. Pat. Nos. 3,997,702 and 4,822,687. By employing such methods, the release values, i.e., peel adhesion, for pressure sensitive adhesives can be readily increased from 10 g/cm of width to several hundred g/cm of width to adjust the ease of transfer of the adhesive from the carrier film of the invention.

It should be understood that the heat-activatable adhesive articles described herein can be adhered to a substrate simply by the application of a sufficient amount of thermal energy alone or in combination with pressure. For example, a heat-activatable adhesive article can be applied to a substrate manually and then without any physical contact, heat can be applied to modify the carrier film of the heat-activatable adhesive article such that adhesive comes into contact with the substrate. In sum, the articles described herein can be applied to a substrate followed by the application of a sufficient amount of heat such that the carrier film is modified to allow the adhesive in the recessed surface portion to contact the substrate.

Alternative methods of applying a heat-activatable adhesive article to a substrate can involve other configurations. These heat-activatable adhesive articles comprise a carrier film, an adhesive layer coated thereon, and a layer of substantially nonadhesive particles coated on the adhesive layer. Once the article is applied to a substrate, the particles keep the adhesive from contacting the substrate. Thus, they act as stand-offs, although they are not a part of the carrier film. Subsequently, a sufficient amount of heat is applied to the heat-activatable adhesive article to modify the substantially nonadhesive particles such that they allow the adhesive layer to contact the substrate. In a preferred embodiment, the substantially nonadhesive particles can sublime, melt, collapse, or shrink, for example, thereby allowing the adhesive to contact the substrate. Thus, as with the stand-offs that are a part of the carrier film, these particles can be modified such that the height they extend above the surface of the adhesive is sufficiently reduced upon the application of heat so the adhesive can contact the substrate.

In such methods, wherein the adhesive articles have substantially nonadhesive particles coated thereon, the carrier film and adhesives are as described above. Preferably, the adhesive is a pressure sensitive adhesive. The substantially nonadhesive particles are of a height and spacing that prevents the adhesive layer from contacting the substrate. In particularly preferred embodiments, the particles are spaced apart by distances that are greater than about twice the diameter of the particles. Before heat modification, i.e., deformation, of the particles, the particles are of a size that is greater than the thickness of the adhesive. Preferably, the size of the particles is greater than about 10 µm, and more preferably greater than about 20 µm. After heat deformation of the particles, they are of a size that is less than the thickness of the adhesive (if they are still discrete particles).

In the embodiments in which there is a layer of substantially nonadhesive particles on the surface, or partially embedded in the surface, of the adhesive layer, the particles can be modified by a variety of mechanisms upon the application of heat. They can be sublimed or vaporized, for example, as are ammonium bicarbonate particles. Alternatively, they can be melted, contracted, shrunk, etc. As long as the particles are modified by the application of heat such that the adhesive can contact the substrate at a temperature below the softening temperature of the carrier film, the particles are useable in the present invention. Such particles should be substantially nonhygroscopic and substantially nondeformable at room temperature (i.e., 20°–30° C.). They should not introduce substantial abhesive properties such that they detrimentally affect the overall adhesion of the article, although there can be very discreet points of nonadhesion. Preferably, they have a melting or subliming temperature of greater than about 120° F. (49° C.) and less than the melting temperature of the carrier film. More preferably, the particles are nontoxic and noncorrosive.

Examples of suitable particles include, but are not limited to, salts or small molecules such as ammonium bicarbonate, ammonium nitrite, azide salts (ammonium, lithium, sodium, potassium salts), oxalic acid, as well as polymeric shards or foams with appropriate softening temperatures such as poly(styrene), poly(methyl methacrylate), poly(vinyl chloride), poly(carbonate), and poly(vinyl acetate). It should be understood that the substantially nonadhesive particles can be slightly tacky, either as a result of the material of which the particles are made or as a result of a thin layer of an adhesive thereon, as discussed above with respect to the raised surface portion.

Objects and advantages of this invention are further illustrated by the following examples, but the particular materials and amounts thereof recited in these examples as well as other conditions and details, should not be construed to unduly limit this invention. All materials are commercially available except where stated or otherwise made apparent.

EXAMPLE 1

A male/female embossed polyvinylchloride film (PVC, designated POLYTHERM™ UG 45/60201, available from Lake Crescent, Inc., Fairlawn, N.J.) having about 36 protrusions/cm$^2$ arranged in a square lattice array, each protrusion about 0.25 mm high, 1.27 mm at the base, and having a rounded top, was coated with AROSET™ 2551-W-52, an acrylic latex adhesive available from Ashland Chemical (Columbus, Ohio), to a wet thickness that was equivalent to the protrusion height. After drying at 65° C. for approximately 15 minutes, the tips of the protrusions were nearly void of adhesive and extended above the thickness of the continuous adhesive layer. The tape was very positionable, i.e., it could be handled aggressively without bonding, and when heated to a temperature greater than 90° C., the protrusions retracted and the adhesive completely wet out glass or aluminum substrates to form an aggressive bond.

EXAMPLE 2

A tape sample was prepared as described in Example 1 except that the PVC film was coated with SYL-OFF™ 292 Silicone, a silicone release coating composition available from Dow Corning (Midland, Mich.), dried and cured at 65° C. for 10 minutes. This was followed by an approximately 8–10 hour post cure at room temperature prior to the application of the adhesive coat to the release-coated surface of the film. The resulting adhesive coated structure performed as a heat-activated positionable adhesive transfer tape when heated to a temperature greater than 90° C.

EXAMPLE 3

Fine shards of polystyrene, prepared by lightly sanding the surface of an expanded polystyrene insulation with 220 Grade WET OR DRY™ Sand Paper, available from Minnesota Mining & Manufacturing (St. Paul, Minn.) were drop coated on the adhesive surface of a SCOTCH™ brand 898 Filament Tape (available from Minnesota Mining & Manufacturing, St. Paul, Minn.) and the shards adhered to the adhesive by lightly pressing them against the adhesive. The resulting positionable tape construction was easily slid into position on an aluminum panel before heating it to approximately 120° C., at which point the polystyrene shards contracted, allowing the adhesive to contact the aluminum panel and form a strong bond. This example demonstrates a construction having paticles that act as stand-offs on the adhesive rather than as a part of the carrier film.

EXAMPLE 4

A construction similar to that described in Example 3 was prepared except that ammonium bicarbonate crystals approximately the same size as table salt crystals (available as AX 1230: CB 130 from Matheson, Colleman and Bell, Norwood, Ohio) were substituted for the polystyrene shards. When this positionable tape construction was heated to approximately 120° C. the ammonium bicarbonate crystals sublimed, allowing the adhesive to contact the aluminum panel and form a strong bond.

EXAMPLE 5

A solution was prepared by mixing 6 g of BOSTIC™ 5303 AC, a modified ethylene vinyl acetate copolymer adhesive available from Bostic (Middleton, Mass.), 5 g dibutyl phthalate, and 17 g heptane and heating the resulting suspension to 45° C. to form a clear solution. This solution was knife coated (gap of 0.25 mm) on the embossed PVC film of Example 1 and dried for 5 minutes at 65° C. to produce a coating which was a nontacky hot melt adhesive at room temperature. The resulting adhesive construction was kiss coated against a wet adhesive coat (40 μm wet thickness) prepared by knife coating an isooctyl acrylate/octyl acrylamide/sodium styrene sulfonate adhesive composition, prepared as described in U.S. Pat. No. 4,629,663, Example 1, which is incorporated herein by reference, onto the nonsiliconized matte side of a PE (polyethylene) coated paper web. This was done within 30 seconds of the latex composition being coated on the PE coated paper web. The resulting PVC film construction was dried at 25° C. for 15 minutes to produce a repositionable tape construction. Examination of the PVC film under an optical microscope confirmed that just the tips of the protrusions were coated with the second adhesive (a PSA).

A sample of this tape was placed on an Al panel inclined at an angle of 60 to 75 degrees relative to the horizontal in an oven maintained at 100° C. No movement of the tape was noted after a period of 10 minutes with only the PSA holding the tape to the Al panel. (The hot melt was very tacky at 100° C. but the protrusions on the PVC embossed film had not retracted to allow the hot melt adhesive to contact the Al panel.) The oven temperature was increased to about 160° C., allowing the protrusions on the PVC embossed film to retract and the tacky hot melt to contact the Al panel, thereby forming a strong bond. (The reason that a higher activation temperature was required in this example as compared to Example 1 is not known.) A portion of the tape was also attached to the bottom of a horizontal glass plate where it was held in place by the PSA on the tips of the protrusions. The tape was then heated with a hot air gun to tackify the hot melt adhesive and to cause the protrusions to retract, allowing the hot melt to wet out the glass and form a strong adhesive bond. This example illustrates a repositionable tape construction utilizing a hot melt adhesive in the recesses of the carrier film and a repositionable adhesive on the tips of the protrusions. It further demonstrates that the tape can be held in place by the PSA and heat activated to form a strong bond all against the force of gravity.

EXAMPLE 6

A series of eight positionable tape constructions were prepared according to the procedure of Example 1 except that the coating gap of the knife coater was progressively increased from 0.225 mm to 0.5 min. (At the 0.225 mm coating gap the coating knife slightly compressed the protrusions of the embossed PVC film.) Each tape was dried at 65° C. until the adhesive coating lost its milky appearance (approximately 5–30 minutes) and the samples qualitatively evaluated for their positionability and repositionability. The tape construction prepared with the lowest coating gap (0.225 mm) was almost slidable, exhibiting some cling, but it would not adhere to the lower surface of a horizontal glass plate. The tape construction prepared with the highest coating gap (0.5 mm) was very grabby, was readily repositionable, and supported its own weight when adhered to the lower surface of a horizontal glass plate. Microscopic examination of the two samples indicated that little adhesive remained on the top of the protrusions of the sample prepared with the 0.225 mm coating gap while considerable adhesive remained on the top of the protrusions of the sample prepared with the 0.5 mm coating gap. Samples prepared with intermediate coating gaps displayed a progressive increase in tackiness as the thickness of the adhesive remaining on the top of the protrusions increased (i.e., corresponding to the larger coating gaps). These constructions were not exposed to heat to invoke the memory effect of the backing as in Example 1. This example demonstrates that thermally activated reposition able tape constructions can be prepared from a single adhesive that is not a repositionable adhesive under normal conditions, but which provides repositionability by controlling the thickness of the adhesive remaining on the top of the protrusions. This also applies to carrier films that are not thermally activatable and to transfer tapes that are not thermally activatable, i.e., carrier films used in standard tape constructions.

Although the invention has been described with respect to specific preferred embodiments, it should be appreciated that other embodiments utilizing the concept of the present invention are possible without departing from the scope of the invention. The invention, for example, is not intended to be limited to the specific adhesive articles disclosed in the preferred embodiments. The invention is not intended to be limited to the preferred embodiments described herein, but rather the invention is defined by the claims and equivalents thereof.

What is claimed is:

1. A heat-activatable adhesive article comprising:
   (a) a substantially laterally stable heat recoverable carrier film of memory shaped material and having at least one surface comprising a recessed surface portion and a raised surface portion therein; and
   (b) an adhesive layer in the recessed surface portion in an amount such that the adhesive does not extend above the raised surface portion thereby forming an exposed raised surface portion.

2. The heat-activatable adhesive article of claim 1 wherein the exposed raised surface portion is substantially nontacky such that the article is positionable.

3. The heat-activatable adhesive article of claim 2 wherein the adhesive is a repositionable adhesive.

4. The heat-activatable adhesive article of claim 2 wherein the exposed raised surface portion is substantially free of adhesive.

5. The heat-activatable adhesive article of claim 1 wherein the exposed raised surface portion has an adhesive coating thereon which is sufficiently tacky to make the article repositionable.

6. The heat-activatable adhesive article of claim 1 wherein the adhesive is a pressure sensitive adhesive.

7. The heat-activatable adhesive article of claim 1 wherein the recessed surface portion comprises a plurality of recesses in a substantially spaced-apart relationship to one another.

8. The heat-activatable adhesive article of claim 7 wherein the recesses are of three dimensional shape having a cross-section of oval, circular, polygonal, or rectangular shape; the cross-section taken parallel to the surfaces of the carrier film.

9. The heat-activatable adhesive article of claim 1 wherein the recessed surface portion comprises one continuous recess.

10. The heat-activatable adhesive article of claim 1 wherein the raised surface portion comprises a plurality of projections in a substantially spaced-apart relationship to one another.

11. The heat-activatable adhesive article of claim 10 wherein the projections are substantially uniformly distributed.

12. The heat-activatable adhesive article of claim 1 wherein the raised surface portion comprises one continuous projection.

13. The heat-activatable adhesive article of claim 1 wherein the carrier film is a polyolefin, polyvinyl chloride, or polyester.

14. The heat-activatable adhesive article of claim 1 wherein the carrier film with a raised surface portion comprises a backing material having stand-offs adhered thereto.

15. The heat-activatable adhesive article of claim 1 wherein the substantially laterally stable heat recoverable carrier film further comprises:
   (a) a second surface comprising a recessed surface portion and a raised surface portion therein; and
   (b) an adhesive in the recessed surface portion of the second surface in an amount such that the adhesive does not extend above the raised surface portion thereby forming an exposed raised surface portion.

16. The heat-activatable adhesive article of claim 1 further comprising a release coating between the carrier film and the pressure sensitive adhesive thereby forming a transfer article.

17. A heat-activatable positionable adhesive tape comprising:
   (a) a carrier film having two oppositely parallel surfaces wherein at least one of the surfaces comprises at least one recess that is substantially continuous and interrupted by projections protruding therefrom,
   (b) a pressure sensitive adhesive in the recess; wherein the carrier film recovers upon exposure to heat thereby allowing the adhesive in the recess to contact a substrate.

18. The heat-activatable positionable adhesive tape of claim 17 further comprising a release coating between the carrier film and the pressure sensitive adhesive thereby forming a transfer tape.

19. The heat-activatable positionable adhesive tape of claim 18 wherein the projections result in perforations in the adhesive upon transfer to the substrate and wherein the projections provide spaces for liquids and gases to pass through the adhesive.

20. The heat-activatable positionable adhesive tape of claim 17 wherein the projections in the carrier film recover upon exposure to heat thereby allowing the adhesive in the recess to contact the substrate.

21. A method of adhering a heat-activatable adhesive article to a substrate comprising:
   (a) applying the heat-activatable adhesive article to the substrate; wherein the heat-activatable adhesive article comprises:
      (i) a substantially laterally stable heat recoverable carrier film of memory shaped material and having at least one surface comprising a recessed surface portion and a raised surface portion therein; and
      (ii) an adhesive layer in the recessed surface portion in an amount such that the adhesive does not extend above the raised surface portion thereby forming an exposed raised surface portion; and
   (b) applying a sufficient amount of heat to the heat-activatable adhesive article such that the carrier film is modified to allow the adhesive in the recessed surface portion to contact the substrate.

22. The method of claim 21 wherein the exposed raised surface portion is substantially nontacky such that the article is positionable.

23. The method of claim 21 wherein the adhesive is a repositionable adhesive.

24. The method of claim 21 wherein the exposed raised surface portion has an adhesive coating thereon which is sufficiently tacky to make the article repositionable.

25. The method of claim 21 wherein the adhesive is a pressure sensitive adhesive.

* * * * *